(12) United States Patent
Lebeda

(10) Patent No.: US 11,846,084 B2
(45) Date of Patent: Dec. 19, 2023

(54) YARD LEVELING AND CONDITIONING APPARATUS

(71) Applicant: Francis C Lebeda, Cedar Rapids, IA (US)

(72) Inventor: Francis C Lebeda, Cedar Rapids, IA (US)

(*) Notice: Subject to any disclaimer, the term of this patent is extended or adjusted under 35 U.S.C. 154(b) by 289 days.

(21) Appl. No.: 17/499,407

(22) Filed: Oct. 12, 2021

(65) Prior Publication Data

US 2022/0112682 A1 Apr. 14, 2022

Related U.S. Application Data

(60) Provisional application No. 63/089,823, filed on Oct. 9, 2020.

(51) Int. Cl.
*E02F 3/00* (2006.01)
*E02F 3/815* (2006.01)

(52) U.S. Cl.
CPC .................................. *E02F 3/8152* (2013.01)

(58) Field of Classification Search
CPC . E02F 3/80; E02F 3/8155; E02F 3/815; E02F 3/8152; A01B 1/00; A01B 31/00; A01B 1/02; A01B 1/028; A01B 1/04; A01B 1/12; A01B 1/14
See application file for complete search history.

(56) References Cited

U.S. PATENT DOCUMENTS

| | | | | | |
|---|---|---|---|---|---|
| 4,899,867 | A | * | 2/1990 | Ryan | B65G 33/30 198/669 |
| 5,505,268 | A | * | 4/1996 | McPherson | A01B 33/12 172/554 |
| 5,579,851 | A | * | 12/1996 | Parkos | A01B 33/021 172/554 |
| 5,894,713 | A | * | 4/1999 | Cullen | A01F 25/14 53/436 |
| 6,497,294 | B2 | * | 12/2002 | Vought | A01B 73/00 172/554 |
| 7,866,124 | B2 | * | 1/2011 | Wingert | B30B 9/301 53/529 |
| 7,926,245 | B2 | * | 4/2011 | Cullen | A01F 25/14 53/523 |
| 8,752,855 | B2 | * | 6/2014 | Dilworth | B62D 49/04 280/481 |

(Continued)

*Primary Examiner* — Chi Q Nguyen
(74) *Attorney, Agent, or Firm* — Mark David Torche; Patwrite Law

(57) ABSTRACT

A yard leveling and conditioning apparatus has a rectangular frame. The frame has a plurality of forward mounted V-shaped knives attached to a forward portion of the frame, and a plurality of rearward mounted V-shaped knives attached to a rearward portion of the frame. The plurality of forward and rearward mounted V-shaped knives project downward when in an engagement position. The apparatus has a first side wheel mounted to a first side of the frame and a second side wheel mounted to a second side of the frame. A third wheel is mounted to the rearward portion of the frame. A tongue is rotatably attached to the forward portion of the frame and is configured for attachment to a pulling source. The first, second and third wheels are configured to project in an upward orientation when in the engagement position and do not touch the ground in the engagement position.

8 Claims, 5 Drawing Sheets

(56) References Cited

U.S. PATENT DOCUMENTS

| | | | |
|---|---|---|---|
| 10,399,521 B2* | 9/2019 | Szurpicki | E02F 3/3604 |
| 10,499,563 B1* | 12/2019 | Metcalf | A63C 19/02 |
| 10,863,676 B2* | 12/2020 | Cullen | B65B 27/125 |
| 2004/0050564 A1* | 3/2004 | Wilson | A01B 31/00 |
| | | | 172/684.5 |
| 2007/0267204 A1* | 11/2007 | Grosberg | A01B 1/00 |
| | | | 172/383 |

* cited by examiner

YARD LEVELING AND CONDITIONING APPARATUS

CROSS REFERENCE TO RELATED APPLICATIONS

This application claims priority and herein incorporates by reference U.S. provisional patent application 63089823, filed Oct. 9, 2020.

BACKGROUND OF THE INVENTION

Historically, the ground was leveled using primitive tools including sticks and stones especially in preparation of planting. In more modern times, metal tools are used to both prepare the ground for planting and general ground leveling. Originally, animals were used to pull plows across the ground to break up, level and prepare the soil for planting and other uses. Of course now machinery is used to pull the implements across the soil. Although the plows used have great utility in preparing the soil for planting and growing since it turns the soil over, it is not as useful on lawns where it may not be desirable to turn over the entire lawn or to tear up the grass.

Yards are often uneven and need treatment to smooth them out (buckboard effect) while not tearing up the grass. Additionally, often there are sidewalks, driveways and other such ground constructions that are difficult to run over and detrimental to a device if dragged across. There is a need for a yard leveling device that may be used to condition and level yards, both grassy or unplanted, while allowing easy and safe traversal over ground constructions.

SUMMARY OF THE INVENTION

A yard leveling and conditioning apparatus has a rectangular frame. The frame has a plurality of forward mounted V-shaped knives attached to a forward portion of the frame, and a plurality of rearward mounted V-shaped knives attached to a rearward portion of the frame. The plurality of forward and rearward mounted V-shaped knives project downward when in an engagement position. The apparatus has a first side wheel mounted to a first side of the frame and a second side wheel mounted to a second side of the frame. A third wheel is mounted to the rearward portion of the frame. A tongue is rotatably attached to the forward portion of the frame and is configured for attachment to a pulling source. The first, second and third wheels are configured to project in an upward orientation when in the engagement position and do not touch the ground in the engagement position.

Other features and advantages of the instant invention will become apparent from the following description of the invention which refers to the accompanying drawings.

DETAILED DESCRIPTION OF THE INVENTION

Figure 1:
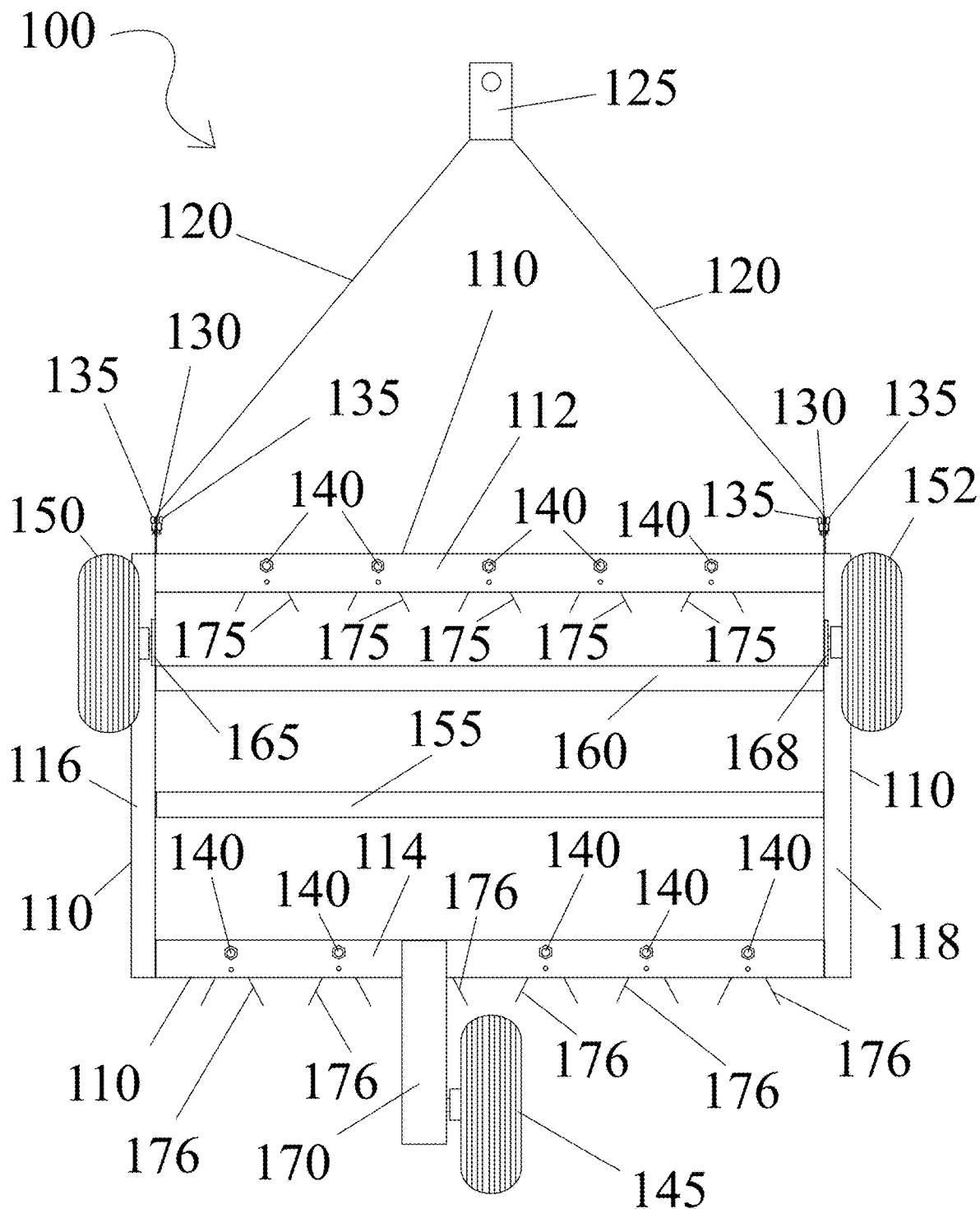
FIG. 1 is a top view of a yard leveling and conditioning apparatus according to an embodiment of the invention.
Figure 2:
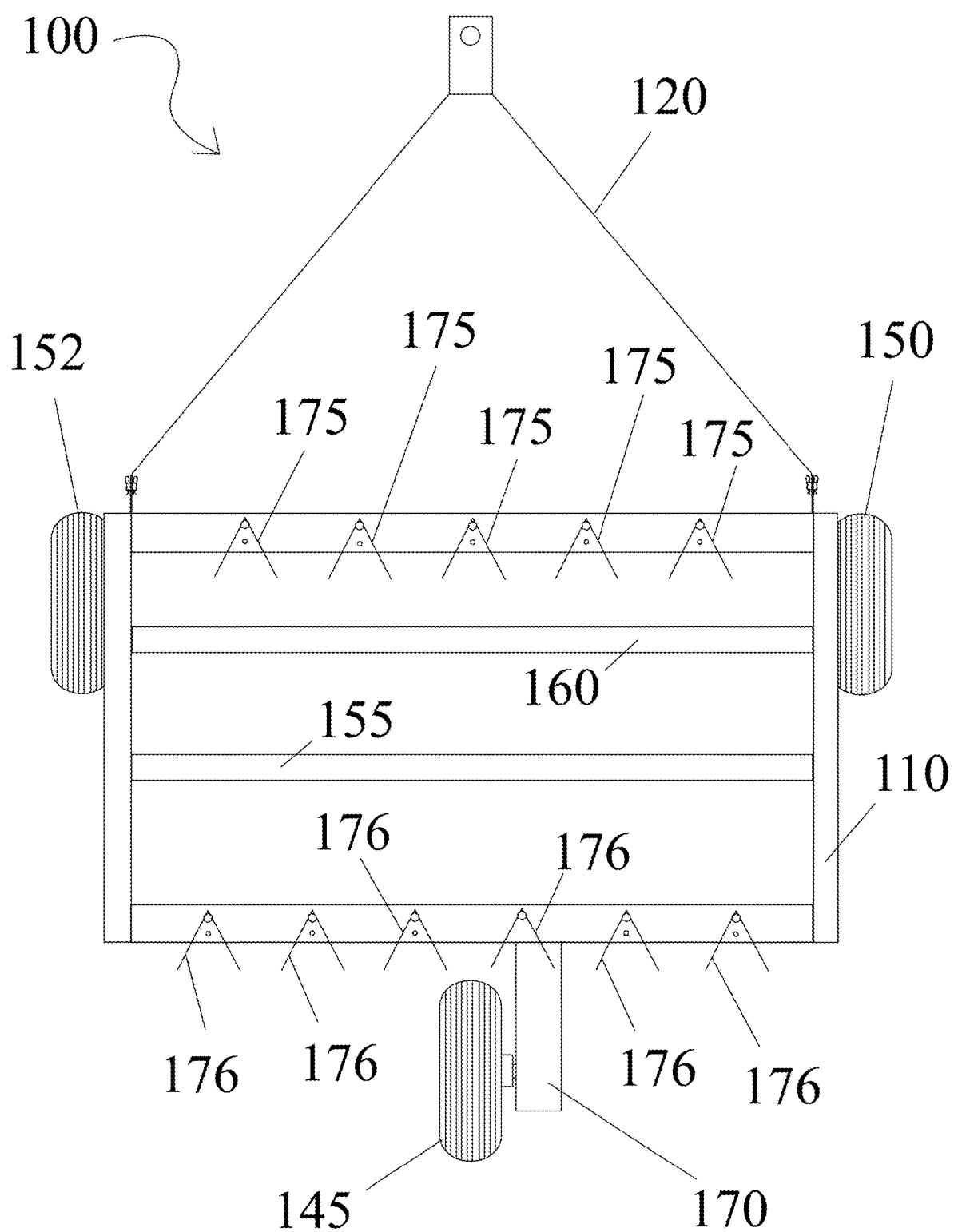
FIG. 2 is a bottom view of the yard leveling and conditioning apparatus shown in FIG. 1.
Figure 3:
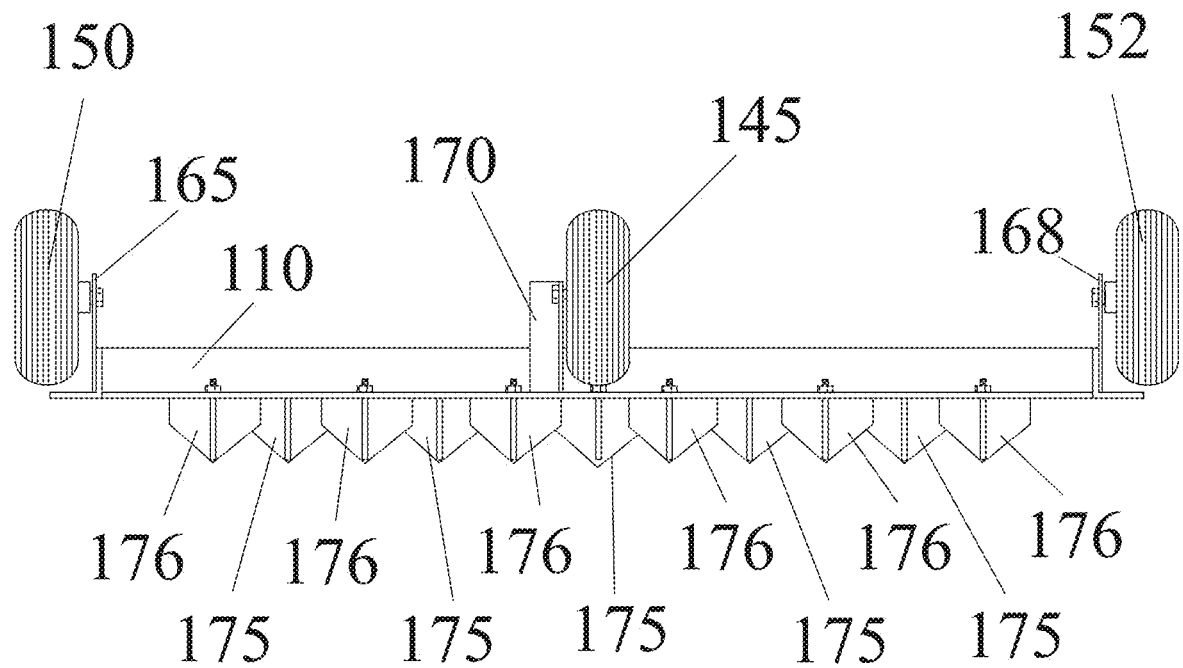
FIG. 3 is a back view of the yard leveling and conditioning apparatus shown in FIG. 1 in a yard engagement configuration.
Figure 4:
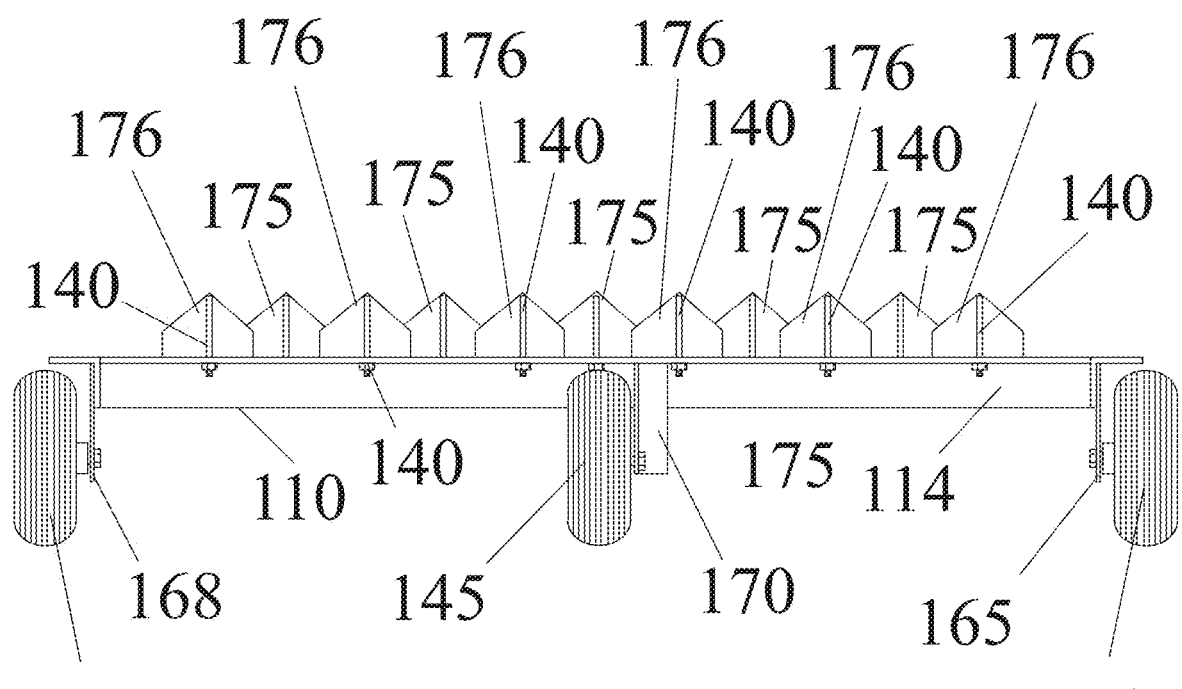
FIG. 4 is a back view of the yard leveling and conditioning apparatus shown in a yard disengagement configuration.
Figure 5:
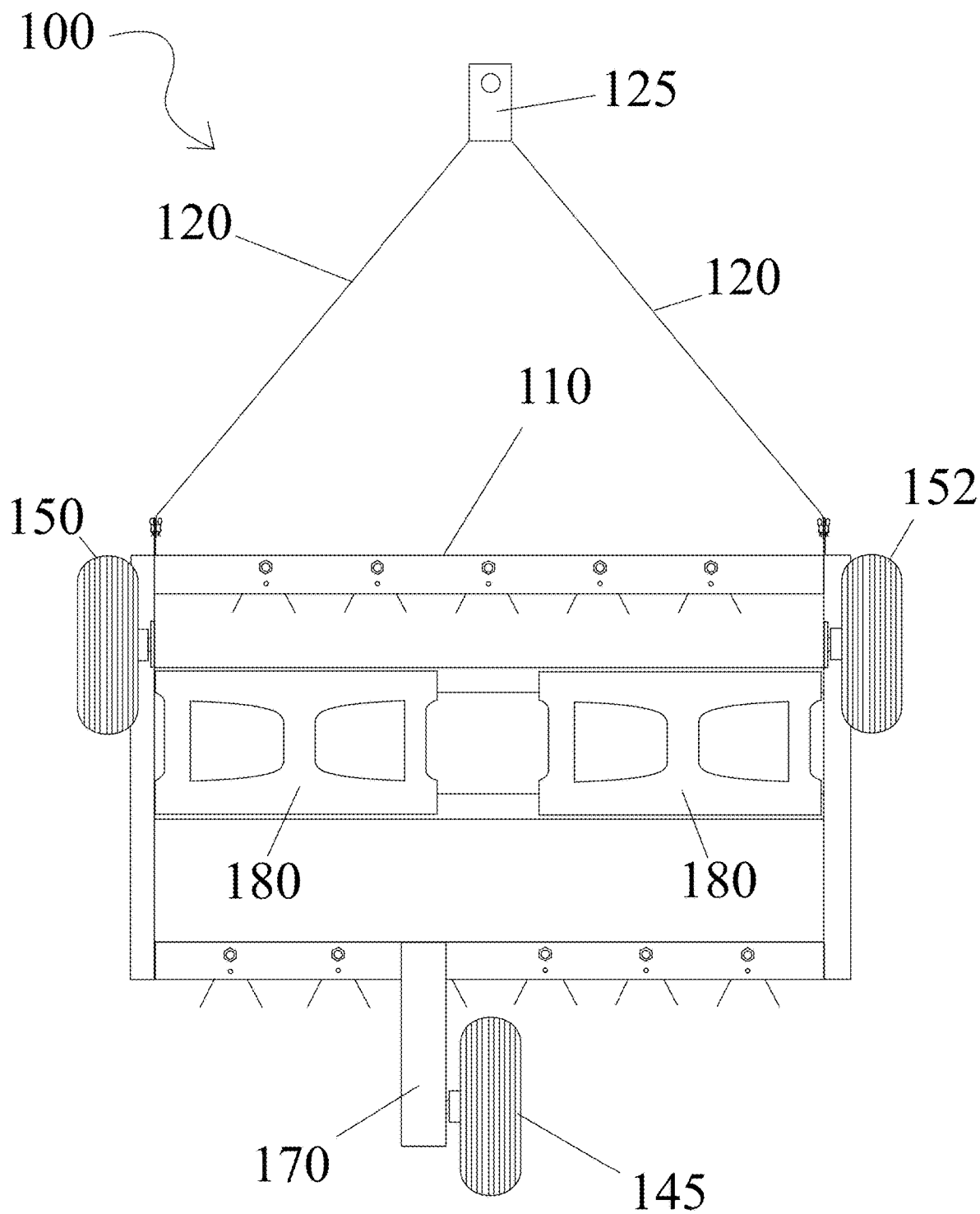
FIG. 5 is a top view of the yard leveling and conditioning apparatus shown in FIG. 1 with ballast applied.
Figure 6:
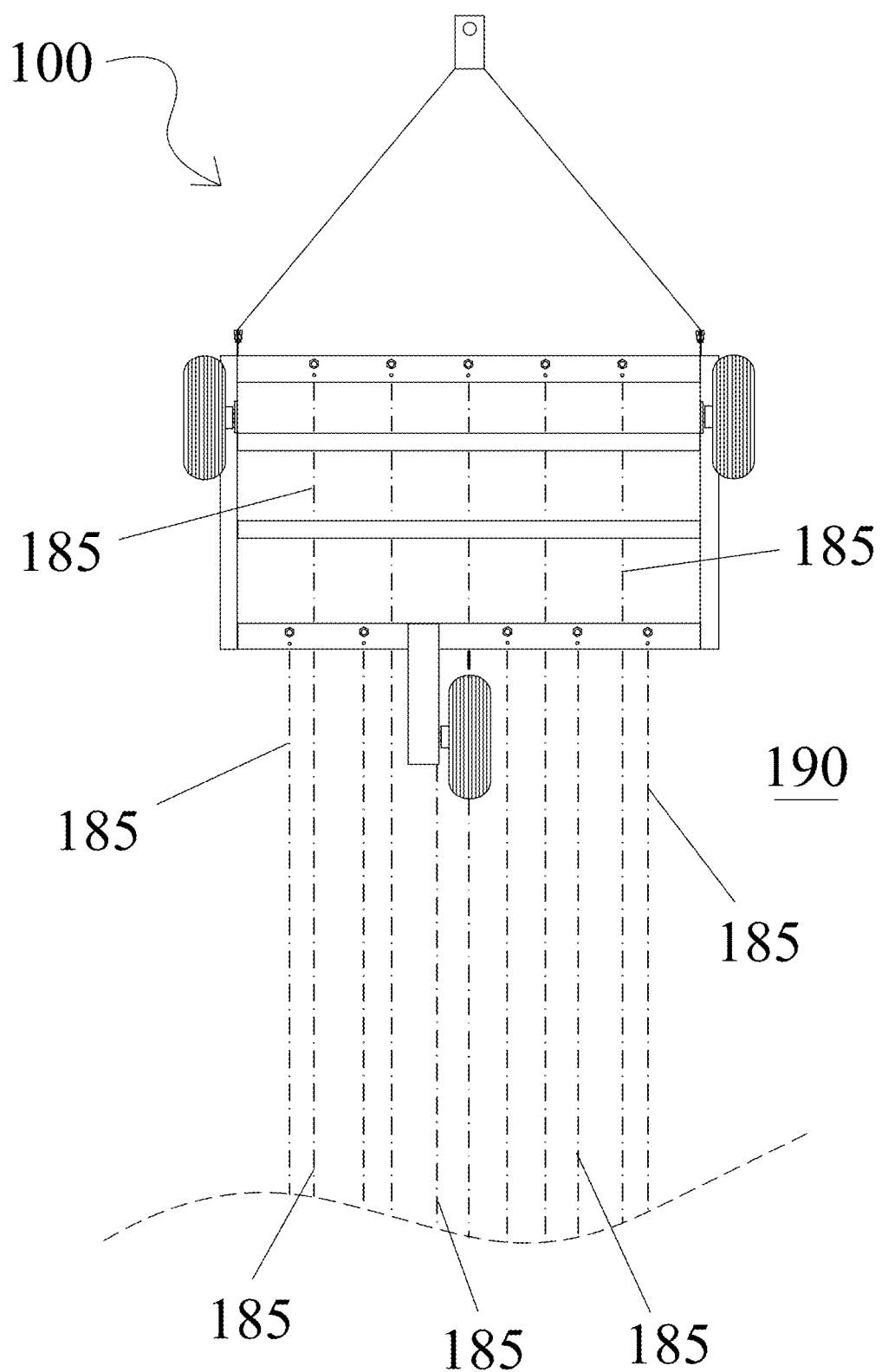
FIG. 6 is a top view of the yard leveling and conditioning apparatus shown in FIG. 1 illustrating how the yard is leveled and conditioned in use.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to the figures, a yard leveling and conditioning apparatus 100 is shown having a frame 110. Frame 110 has a forward portion 112 that supports a plurality of forward mounted V-shaped knives 175 that are attached using knife attachment bolts 140. Frame 110 also has a rearward portion 114 supporting a plurality of rearward mounted V-shaped knives 176 attached thereon. A first support bar 155 and a second support bar 160 is attached to frame 110 to provide support for optional ballast 180. A first side wheel 150 is mounted using a first side wheel mounting plate 165 which is attached to a first side 116 of frame 110. A second side wheel 152 is mounted using a second side wheel mounting plate 168 which is attached to a second side 118 of frame 110. A third wheel 145 is mounted to a third wheel mounting support 170 which is attached to rearward portion 114 of frame 110. A tongue 120 is pivotally attached to a front portion of frame 110 using a pair of tongue pivots 130 and locking pins 135. An attachment plate 125 is provided to attach yard leveling and conditioning apparatus to a pulling source (not shown) as is known in the art.

In an engagement position, all V-shaped knives 175 and 176 face down towards a yard 190 with both side wheels 150, 152 and third wheel 145 facing upward without contacting yard 190. In the engagement position, yard leveling and conditioning apparatus 100 is pulled across yard 190 which helps level and condition yard 190. In some applications is may be necessary to repeat the procedure several times to get optimal results. In the disengagement position, yard leveling and conditioning apparatus 100 is pulled across the construction such as sidewalk or driveway, etc. so that V-shaped knives 175 and 176 are not damaged nor damaging the sidewalk, etc.

Forward mounted V-Shaped knives 175 are staggered between rearward mounted V-shaped knives 176. This provides better coverage while allowing sufficient separation therein and to prevent them from tearing up the grass on lawns. Because V-shaped blades 175 and 176 are bolted to frame 110 using knife attachment bolts 140, they can be easily replaced or repaired if needed. Of course it is possible to permanently attach them as well such as by welding them to frame 110. V-shaped knives 175 and 176 are made of stainless steel, but of course other materials may be used as is known in the art. In the embodiment shown, five forward mounted V-shaped knives 175 and six rearward mounted V-shaped knives 176 are shown, but it is understood that other combinations of knives may be used including but not limited to adding additional rows of knives or a different number of knives used without departing from the scope of the instant invention.

Frame 110 is made of angle iron, but may be made of angle aluminum or other suitable material. The size of V-shaped knives 175 and 176 allow them to go into the soil between 2 to 3 inches, but again, the exact dimensions may vary depending on the specific use or yard type. In this way, high points will lowered and in bare ground, furrows 185 will be produced which can be used to seed yard 190 using an optional grass seeding attachment (not shown) that is attached to rearward portion 114 thereon or other seeding procedure as is known in the art. The size of frame 110 may be scaled to meet specific needs but in general it is dimensioned to be pulled by household machines such as tractors, ATVs, riding lawn mowers, etc.

In operation, it is often necessary to traverse driveways or sidewalks where it would be difficult or dangerous to drag V-shaped knives 175 across. To facilitate this situation, yard leveling and conditioning apparatus 100 is flipped over where it rests on side wheels 150, 152 and third wheel 145 with V-shaped knives 175 and 176 pointing upward and disengaged from touching yard 190. Once across the obstacle, yard leveling and conditioning apparatus 100 is flipped over with V-shaped knives 175 and 176 engaging yard 190 to allow the user to level and condition yard 190.

Ballast 180 consists of concrete blocks that fit between first and second supports 155 and 160 to apply additional downward force. Of course other ballast may be used as long as it provides additional weight which will force V-shaped knives 175 and 176 to engage yard 190. In general, first side wheel, second side wheel and third wheel are air filled pneumatic tires but of course other wheels may be used such as, but not limited to solid rubber or metal wheels as is known in the art.

Although the instant invention has been described in relation to particular embodiments thereof, many other variations and modifications and other uses will become apparent to those skilled in the art.

What is claimed is:

1. A yard leveling and conditioning apparatus comprising:
   a frame;
   a plurality of forward mounted V-shaped knives attached to a forward portion of said frame;
   a plurality of rearward mounted V-shaped knives attached to a rearward portion of said frame;
   said plurality of forward mounted V-shaped knives and said rearward mounted V-shaped knives are configured to project in a downward orientation in an engagement position;
   a first side wheel mounted to a first side of said frame;
   a second side wheel mounted to a second side of said frame;
   a third wheel mounted to said rearward portion of said frame;
   a tongue rotatable attached to said forward portion of said frame;
   said tongue having an attachment plate wherein said tongue is configured for attachment to a pulling source; and
   said first, second and third wheels configured to project in an upward orientation in a non-engagement position wherein said first, second and third wheels do not touch a yard in said non-engagement position.

2. The apparatus of claim 1 wherein said plurality of forward mounted V-shaped knives are positionally staggered from said plurality of rearward mounted V-shaped knives.

3. The apparatus of claim 1 wherein said plurality of forward mounted V-shaped knives and said plurality of rearward mounted V-shaped knives are removably attached to said frame using bolts.

4. The apparatus of claim 1 further comprising:
   a first support bar orthogonally disposed between said first side and said second side;
   a second support bar orthogonally disposed between said first and said second side;
   wherein said first and second support bar is configured to removably support at least one ballast.

5. The apparatus of claim 4 wherein said at least one ballast is a concrete block.

6. The apparatus of claim 1 wherein said frame is made of angle iron.

7. The apparatus of claim 1 where said first side wheel, said second side wheel and said third wheel are pneumatic tires.

8. The apparatus of claim 1 wherein said first side wheel is mounted to said first side using a first side wheel mounting plate and said second side wheel is mounted to said second side using a second side mounting plate and said third wheel is mounted to said rearward portion using a third wheel mounting support.

* * * * *